Warren & Johnston,
Farriers' Tool.

No. 42,918. Patented May 24, 1864.

Witnesses:
D. P. Coombs
Henry Morris

Inventor:
E. Warren
Wm. Johnston
per Munn & Co.
Attorneys.

UNITED STATES PATENT OFFICE.

E. WARREN AND WM. JOHNSTON, OF MARSHALL, MICHIGAN, ASSIGNORS TO E. WARREN, OF SAME PLACE.

IMPROVEMENT IN FARRIERS' TOOLS.

Specification forming part of Letters Patent No. 42,918, dated May 24, 1864.

*To all whom it may concern:*

Be it known that we, E. WARREN and WILLIAM JOHNSTON, both of Marshall, in the county of Calhoun and State of Michigan, have invented a new and useful combination of a nippers, clinching-tool, rasp, and punch, designed for horseshoers, farmers, &c.; and we do hereby declare that the following is a full, clear, and exact description of the same, reference being had to the accompanying drawings, making a part of this specification, in which—

Figure 1:
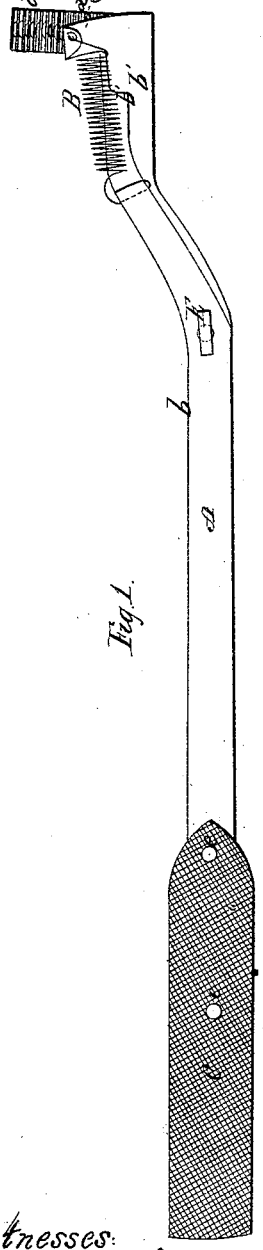
Figure 2:
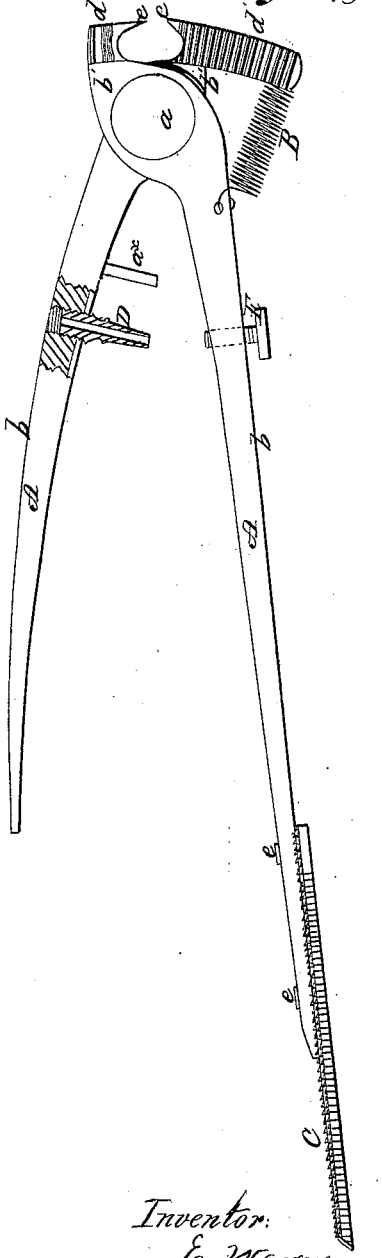

Figure 1 is an edge view of our invention; Fig. 2, a side view of the same.

Similar letters of reference indicate corresponding parts in the two figures.

This invention consists in combining with a nippers and clinching device such as was patented by E. Warren, one of the above-named applicants, on November 3, 1863, a rasp and punch constructed and arranged in such a manner as to form a very convenient and useful implement or tool for horseshoers, horse-owners, farmers, &c.

The invention is composed of two levers, which cross each other, and are secured together by a fulcrum-pin near one end, the long arms of the levers forming the handles of the implement or tool, and the short arms provided with cutting-edges, which constitute the nippers, said short arms being also provided with projecting bars, toothed or corrugated to form the clinching-tool, while one of the handles has a rasp attached to it, and the other a punch, which when used is made to cut against a soft-metal adjustable stop. The levers have also a spiral spring attached to them for the purpose of keeping the nippers open or the short arms of the levers spread apart.

To enable those skilled in the art to fully understand and construct our invention, we will proceed to describe it.

A A represent two levers which cross each other, and are connected together near one end by a fulcrum-pin, $a$. The long arms $b\ b$ of these levers form the handles of the tool or implement, and the short arms $b'\ b'$ of said levers are provided with cutting-edges $c$, like those of ordinary nippers. One of the short arms $b'$ is provided with a projection, $d$, which is toothed or corrugated, and the other short arm is provided with a similar but rather longer projection, $d'$, which is also toothed or corrugated, but has a position at right angles, or nearly so, with the projection of the other short arm. These toothed or corrugated projections form the clinching device, and they, as well as the nippers $c$, may be constructed substantially in the same way as described in the Letters Patent of E. Warren, previously alluded to.

To the long projection $d'$, at its outer end, there is attached one end of a spiral spring, B, the opposite end of said spring being attached to the long arm $b$ of the lever which has the short projection $d$ on its short arm $b'$. This spring B has a tendency to keep the nippers $c\ c$ of the two levers A A distended or apart, as shown in Fig. 2.

To the outer part of one of the levers A there is secured by screws $e$ a rasp, C, which may be cut on both sides. This rasp may be of any desired or proper length or proportion, and it is designed for finishing or rasping out under the nails of the shoe, and forms a very convenient and useful combination with the nippers and clinching device.

D represents a punch, which is of the tubular form usually employed for punching holes in harness-straps and other articles made of leather. This punch is screwed into the inner side of the long arm $b$ of one of the levers A, and in the long arm of the other lever A there is fitted a thumb-screw, E, of brass or other soft metal, to serve as a bed for the punch D to cut against, so as not to blunt or injure the cutting-edge of the punch. This punch serves as a stop for the levers A A, and prevents the nippers $c\ c$ from being brought in contact. The wear of the punch D is compensated for by the thumb-screw E, which may be screwed up or farther toward the punch D from time to time, as may be required. This punch will be found extremely useful in many cases. Farmers and horse-owners generally frequently require to use a leather-punch to repair harness, &c., and as our implement is designed for their use, as well as for horseshoers, the punch will be found to be a great acquisition to the device.

The spiral spring B is an improvement over the ordinary flat spring placed between the levers A, as the former, in case of breakage, may be readily replaced by a new one by any person; but a flat spring could not be replaced by any one except a mechanic, and, besides, it cannot be used in this invention, as it would interfere with the punch D.

We would remark that the usual stop or post, $a^*$, may be applied to the device. That may be useful in case the punch should be detached at any time.

We would further remark that the short projection $d$ may be made with a longitudinal groove or be of concave form, so as to receive the head of the nail when the device is applied to the horse's hoof. The handles may also be of curved form, as shown in Fig. 1.

We do not claim, separately, the nippers and clinching device, for they have been previously used; but,

Having thus described our invention, what we do claim as new, and desire to secure by Letters Patent, is—

As a new article of manufacture, the combined nippers, clinching-tool, rasp, and punch, constructed in the manner herein represented and described.

E. WARREN.
WM. JOHNSTON.

Witnesses:
E. H. LAWRANCE,
J. W. JAGER.